US011586605B2

(12) United States Patent
Cheng et al.

(10) Patent No.: US 11,586,605 B2
(45) Date of Patent: Feb. 21, 2023

(54) PROCESSING METHOD FOR CHANGING TIME-SERIES DATABASE TABLE STRUCTURE

(71) Applicant: TAOS DATA, Beijing (CN)

(72) Inventors: Hongze Cheng, Beijing (CN); Shengliang Guan, Beijing (CN); Haojun Liao, Beijing (CN); Jianhui Tao, Beijing (CN)

(73) Assignee: TAOS DATA, Beijing (CN)

( * ) Notice: Subject to any disclaimer, the term of this patent is extended or adjusted under 35 U.S.C. 154(b) by 0 days.

(21) Appl. No.: 17/265,278

(22) PCT Filed: Jul. 18, 2019

(86) PCT No.: PCT/CN2019/096450
§ 371 (c)(1),
(2) Date: Feb. 2, 2021

(87) PCT Pub. No.: WO2020/024797
PCT Pub. Date: Feb. 6, 2020

(65) Prior Publication Data
US 2021/0279223 A1   Sep. 9, 2021

(30) Foreign Application Priority Data

Aug. 3, 2018 (CN) .......................... 201810879113.1

(51) Int. Cl.
G06F 16/22 (2019.01)
G06F 16/21 (2019.01)
G06F 16/23 (2019.01)

(52) U.S. Cl.
CPC ........ *G06F 16/2282* (2019.01); *G06F 16/213* (2019.01); *G06F 16/2365* (2019.01)

(58) Field of Classification Search
CPC . G06F 16/2282; G06F 17/213; G06F 16/2365
See application file for complete search history.

(56) References Cited

U.S. PATENT DOCUMENTS

| 2003/0140284 A1* | 7/2003 | Dettinger | G06F 11/1052 714/48 |
|---|---|---|---|
| 2006/0236317 A1 | 10/2006 | Wetherly et al. | |
| 2006/0248182 A1* | 11/2006 | Glassco | H04L 67/322 709/223 |
| 2007/0088766 A1 | 4/2007 | Bodge et al. | |
| 2010/0121839 A1* | 5/2010 | Meyer | G06F 16/972 707/720 |
| 2014/0052761 A1* | 2/2014 | Teitelbaum | G06F 16/211 707/803 |
| 2014/0229429 A1* | 8/2014 | Bestgen | G06F 16/902 707/609 |
| 2014/0337282 A1* | 11/2014 | Mesika | G06F 16/21 707/609 |
| 2017/0076342 A1* | 3/2017 | Golec | G06Q 30/04 |

FOREIGN PATENT DOCUMENTS

| CN | 101167053 A | 4/2008 |
|---|---|---|
| CN | 101256522 A | 9/2008 |
| CN | 102098342 A | 6/2011 |
| CN | 109189783 A | 1/2019 |

* cited by examiner

*Primary Examiner* — Ashish Thomas
*Assistant Examiner* — Dustin D Eyers
(74) *Attorney, Agent, or Firm* — Greer, Burns & Crain, Ltd.

(57) ABSTRACT

The invention discloses a processing method for process changing time-series database table structure, wherein comprising following steps: an application side generates a data table containing a table name ID, a schema version, and a column ID; when a data column is increased, the application side modifies a schema of the data table, increases the schema version, assigns a new column ID number to a newly increased column incrementally, and assigns a default value to the newly increased column; according to a data insertion request of the application side, a data node receives data of a schema version carrying a data table from the application side and writes the received data, wherein writing the received data comprises: storing the schema version of the data table carried by data from the application side by the data node, and writing the received data, and writing the received data; when the data node receives new data from the application side, comparing the schema version of the data table carried by the new data with a stored schema version of the same data table; and the data node writes data according to the comparison result. According to the method, the operation of changing the structure of a table can be completed instantly, the historical data does not need to be changed, new and old table structure definitions can be used in parallel, and the flexibility can be improved.

10 Claims, No Drawings

PROCESSING METHOD FOR CHANGING TIME-SERIES DATABASE TABLE STRUCTURE

CROSS-REFERENCE TO RELATED APPLICATIONS

This application is a U.S. national stage application of PCT/CN2019/096450 filed Jul. 18, 2019 which claims the benefit of priority to Chinese Patent Application CN201810879113.1 filed Aug. 3, 2018, the entire disclosures of which are incorporated herein by reference.

TECHNICAL FIELD

The invention relates to the field of data processing, specifically to a processing method for changing time-series database table structure.

BACKGROUND ART

One data sampler often collects multiple parameters at the same time point, and the number of parameters may change with the update of a software or firmware. In order to cope with the change, one existing mode is to store each collected parameter as one independent time series, which is very flexible, but each series needs to save its own timestamp, so that the storage space is wasted and the calculation operation between different collected parameters is inconvenient. Another mode is to adopt a traditional relational database, where each parameter is one column and multiple parameters are multiple columns, having the advantage that multiple columns share one timestamp. But the disadvantage is obvious in that adding a new parameter requires adding a new column. For tables with a large number of recorded entries, this would be an extremely inefficient operation because all existing data needs to be updated.

SUMMARY OF THE INVENTION

The object of the invention is to overcome the defects of the prior art, and provides a processing method for changing time-series database table structure. According to the method, changing the structure of a table can be completed instantly, the historical data does not need to be changed, new and old table structure definitions can be used in parallel, and the flexibility can be improved.

The present invention provides a processing method for changing time-series database table structure, comprising the following steps:
an application side generates a data table containing a table name ID, a schema version, and a column ID; when a data column is increased, the application side modifies a schema of the data table, increases the schema version, assigns a new column ID number to a newly increased column incrementally, and assigns a default value to the newly increased column;
according to a data insertion request of the application side, a data node receives data of a schema version carrying a data table from the application side and writes the received data, wherein writing the received data comprises:
storing the schema version of the data table carried by data from the application side by the data node, and writing the received data;
when the data node receives new data from the application side, comparing the schema version of the data table carried by the new data with a stored schema version of the same data table; and the data node writes the data according to a comparison result.

Further, an increased schema version is modified from 0 or a certain number, each time the schema being modified, the scheme version is increased by 1.

Further, the column ID starts to grow naturally from 0 or a certain number, wherein a corresponding column ID is not reused when a column is deleted.

Further, each value of column can be assigned a default value.

Further, if a column is deleted, the column is directly deleted from the data table.

Further, when a name of a column is modified, any modification can be made as long as the uniqueness of the name of the column in a table is guaranteed.

Further, according to the comparison result, the data node takes writing processing, comprising:
if the result is consistent, directly writing the data into a memory cache region;
if the schema version of the application side is less, processing as an error; and
if the schema version of the application side is greater, the data node taking the following steps:
a. all data of a data sampler in a memory cache region are stored on a disk;
b. obtaining the latest schema definition of the data sampler from the data table on the application side; and
c. after obtaining the latest schema definition, redistributing a new memory cache region, and writing data therein.

Further, when data is written into a disk from the cache region, a new data block and corresponding index block information are established; the definition of the schema thereof is stored in the new data block or the index block.

Further, further comprising an inquiring step as follows: when inquiring, the application side informs a system of the columns that need to be queried, and the system needs to convert the columns into column IDs and then sends an inquiring request to a corresponding data node.

Further, the data node determines a data block meeting conditions according to inquiring conditions, if a column to be inquired is defined in the data block, normal processing is carried out, otherwise, a default value is returned.

The processing method for changing time-series database table structure provided by the present invention can realize advantages as follows:
1) the schema modification can be completed instantly, the historical data on the data node does not need to be changed, and the flexibility is high;
2) for the writing and inquiring processes, compared with the traditional mode, the increased system overhead is relatively low; and
3) the application side can continue to work even if the latest schema is not updated, the new schema and the old schema can exist in parallel, and the applicability thereof is strong.

DETAILED DESCRIPTION OF THE INVENTION

While specific embodiments of the present invention will be described in detail below, it is necessary to point out that the following implementations are only used for further explanation of the present invention and cannot be understood as a limitation of the protection scope of the present invention. Some non-essential improvements and adjustments made to the present invention by those skilled in the art based on the above content of the present invention still belong to the protection scope of the present invention.

The invention provides a processing method for changing time-series database table structure, which is specifically introduced below.

1. The Adjustment of the Table Structure (Schema)

A schema version is contained in the definition of the table structure, starting with 0 or a certain number, the schema being modified once at a time and 1 being increased In addition to column name and data type the table structure contains a column ID. The column ID starts to grow naturally from 0 or a certain number, wherein a corresponding column ID is not reused when a column is deleted, when a name of a column is modified, any modification can be made as long as uniqueness of the name of the column in a table is guaranteed which.

2. The Adjustment of the Index Block in an Index File

Each index block needs to contain schema information, including
 data type
 number of bytes
 Column ID Schema parameter may also be placed in a data block of a data file.

3. The Process of Modifying Schema

After a request for modifying the schema of the data table is submitted, the metadata node of the application side for maintaining the data sampler schema has only the following three simple operations.

1) The schema version needs to be increased by one;

2) assigns a new column ID number to a newly increased column incrementally, and assigns a default value to the newly increased column 3) if a column is to be deleted, simply delete the column from the schema.

4) for modifying the name of a table or a column, any modification can be made as long as the uniqueness of the name is guaranteed.

4. The Adjustment of the Data Writing Process

1) The data node saves a schema for each data sampler.

2) The insertion request at the application side contains the schema version.

3) The data node compares the saved schema version with the schema version transmitted from the application side. If the two are consistent, normal processing is carried out. If the schema version of the application side is less, processing as an error. But if the schema version of the application side is greater, it means that the schema of application side has been updated to the latest version. At this time, the data node needs to take the following steps:

a. all data of a data sampler in a memory cache region are stored on a disk;

b. obtaining the latest schema definition of the data sampler form the metadata node in the application side; and c. after obtaining the latest schema, redistributing a new memory cache region and writing data therein;

4) When data is written into a disk from a cache region, whether the schema version is changed or not needs to be checked. If the schema version is changed, the old data block needs to be closed, a new data block needs to be established, and the new data block is provided with a new schema definition.

5. The Adjustment of the Data Inquiring Process

1) When inquiring, the application side needs to inform a system which columns need to be inquired and processed, and the system needs to convert the columns into column IDs and then sends an inquiring request to a corresponding data node;

2) the data node firstly determines a data block meeting conditions according to the inquiring conditions;

3) if the column to be inquired is defined in the data block, a normal process is carried out. If the inquired column is not defined in the data block, a default value is returned.

Although the exemplary implementations of the present invention have been described for illustrative purposes, those skilled in the art will understand that various modifications, additions, and substitutions, and like changes can be made in form and details without departing from the scope and spirit of the invention disclosed in the appended claims. and all these changes shall fall within the protection scope of the appended claims of the present invention. Various steps in various departments and methods of the products claimed by the present invention can be combined in any combination. Therefore, the description of the implementations disclosed in the present invention is not intended to limit the scope of the present invention, but is used to describe the invention. Accordingly, the scope of the present invention is not limited by the above implementations, but is defined by the claims or the equivalents thereof.

The invention claimed is:

1. A processing method for changing time-series database table structure, wherein comprising the following steps:
 an application side generates a data table containing a schema version, and when a data column is increased, the application side increases the schema version of the data table;
 when a data node receives, according to a data insertion request of the application side, a current data carrying a current schema version of the data table from the application side,
 the data node stores the current schema version of the data table carried by the current data from the application side, and
 compares the current schema version of the data table carried by the current data with a previous schema version of the same data table from the application side previously stored the data node;
 if the comparison result is consistent, the data node directly writes the current data into the memory cache region;
 if the current schema version is greater than the previous schema version of the stored the data node, the data node stores a previous data from the application side stored in the memory cache region to a hard disk; and
 after the previous data stored in the memory cache region is stored to the hard disk, the data node redistributes, according to a current schema definition obtained from the application side, a new memory cache region, and writes the current data from the application side into the new memory cache region.

2. The method of claim 1, wherein an increased schema version is modified from 0 or a certain number, each time the schema being modified, the scheme version is increased by 1.

3. The method of claim 1, wherein the column ID starts to grow naturally from 0 or a certain number, wherein a corresponding column ID is not reused when a column is deleted.

4. The method of claim 1, wherein if a column is deleted, the column is directly deleted from the data table.

5. The method of claim 1, wherein when a name of a column is modified, any modification can be made as long as uniqueness of the name of the column in a table is guaranteed.

6. The method of claim 1, wherein
if the current schema version is less than the previous schema version, the data node handles it as an error.

7. The method of claim 6, wherein when data is written into a disk from the cache region, a new data block and corresponding index block information are established; the definition of the schema thereof is stored in the new data block or the index block.

8. The method of claim 1, further comprising an inquiring step as follows: when inquiring, the application side informs a system of the columns that need to be queried, and the system needs to convert the columns into column IDs and then sends an inquiring request to a corresponding data node.

9. The method of claim 8, wherein the data node determines a data block meeting conditions according to inquiring conditions, if a column to be inquired is defined in the data block, normal processing is carried out, otherwise, a default value is returned.

10. The method of claim 1, wherein the data table generated by the application side further containing a table name ID and a column ID, and when the data column is increased, the application side assigns a new column ID to a newly increased data column incrementally, and assigns a default value to the newly increased column.

* * * * *